United States Patent
White et al.

(10) Patent No.: US 7,054,488 B2
(45) Date of Patent: May 30, 2006

(54) METHOD FOR DETERMINING TRANSPARENCY IN IMAGES EXTRACTION

(75) Inventors: Greg White, Sunnyvale, CA (US); Robert Kieffer, San Francisco, CA (US); Keith Bernstein, San Francisco, CA (US)

(73) Assignee: America Online, Inc., Dulles, VA (US)

( * ) Notice: Subject to any disclaimer, the term of this patent is extended or adjusted under 35 U.S.C. 154(b) by 662 days.

(21) Appl. No.: 10/182,987

(22) PCT Filed: Jan. 31, 2001

(86) PCT No.: PCT/US01/03171

§ 371 (c)(1),
(2), (4) Date: Aug. 2, 2002

(87) PCT Pub. No.: WO01/57800

PCT Pub. Date: Aug. 9, 2001

(65) Prior Publication Data

US 2003/0142090 A1 Jul. 31, 2003

Related U.S. Application Data

(60) Provisional application No. 60/180,440, filed on Feb. 4, 2000.

(51) Int. Cl.
*G06K 9/46* (2006.01)
*G06K 9/74* (2006.01)
(52) U.S. Cl. ..................... 382/190; 382/212
(58) Field of Classification Search ............... 382/144, 382/162, 164, 165, 173, 190, 212, 213, 222, 382/276, 284, 295; 345/354

See application file for complete search history.

(56) References Cited

U.S. PATENT DOCUMENTS 4,590,608 A * 5/1986 Chen et al. .................. 382/281

(Continued)

FOREIGN PATENT DOCUMENTS

JP 10215368 11/1998

OTHER PUBLICATIONS

*Masks & Transparent BitBit's,* Download this tutorial and Example Code.

(Continued)

*Primary Examiner*—Andrew W. Johns
*Assistant Examiner*—Amir Alavi
(74) *Attorney, Agent, or Firm*—Michael A. Glenn; Glenn Patent Group

(57) ABSTRACT

A method for determining transparency in image extraction creates a first mask bitmap by combining a first image and a second image, wherein the first image and the second image have the same size and are the same except for transparent areas. A second mask bitmap is created which displaces pixels of first RGB values in the first image to second RGB values. The first mask bitmap is applied to the second mask bitmap by performing an 'OR' operation on the first and second mask bitmaps. Pixels in the resulting bitmap of the 'OR' operation which have the first RGB values are transparent. Pixels in the resulting bitmap of the 'OR' operation, corresponding to the pixels in the first image that had the first RGB values, have the second RGB values. Pixels are identified in the resulting bitmap of said 'OR' operation which have said first RGB values as transparent.

14 Claims, 1 Drawing Sheet

U.S. PATENT DOCUMENTS

| | | | | |
|---|---|---|---|---|
| 5,491,332 | A * | 2/1996 | Inbar et al. | 250/221 |
| 5,583,950 | A * | 12/1996 | Prokoski | 382/212 |
| 5,889,522 | A | 3/1999 | Chew et al. | 345/354 |
| 6,026,187 | A * | 2/2000 | Siegel | 382/213 |
| 6,470,100 | B1 * | 10/2002 | Horiuchi | 382/295 |
| 6,683,984 | B1 * | 1/2004 | Simske et al. | 382/190 |
| 6,721,446 | B1 * | 4/2004 | Wilensky et al. | 382/162 |

OTHER PUBLICATIONS

*How to create a Transparent Bitmap Using Visual Basic (Q94961).*

*Transparent ATL Controls,* Mar. 1998.

* cited by examiner

METHOD FOR DETERMINING TRANSPARENCY IN IMAGES EXTRACTION

This application is a 371 of PCT/US01/03171 Jan. 31, 2001, which claims benefit of 60/180,440 Feb. 4, 2000.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office file or records, but otherwise reserves all copyright rights whatsoever.

BACKGROUND OF THE INVENTION

1. Technical Field

The invention relates generally to image processing technology. More particularly, the invention relates to a process and method for algorithmic determination of image transparency.

2. Description of Prior Art

When extracting images from another program, transparency needs to be handled correctly because the transparent portion of the images may change to another color during transformation.

One solution is to analyze each byte of the two input images directly in the visual basic code, but that is too slow. The alternative solution is to make use of the bitmap operations, which are faster, by setting the transparent portions of the images to white during the extraction process. This solution is still problematic because when making all white pixels transparent, any pixels that were white in the original image will be also changed to be transparent in the exported image.

What is desired is to develop a process for determining transparency of exported images wherein transparency is not shown where it should not be shown.

SUMMARY OF THE INVENTION

A method for determining transparency in image extraction creates a first mask bitmap by combining a first image and a second image, wherein the first image and the second image have the same size and are the same except for transparent areas. A second mask bitmap is created which displaces pixels of first RGB values in the first image to second RGB values. The first mask bitmap is applied to the second mask bitmap by performing an 'OR' operation on the first and second mask bitmaps. Pixels in the resulting bitmap of the 'OR' operation which have the first RGB values are transparent. Pixels in the resulting bitmap of the 'OR' operation, corresponding to the pixels in the first image that had the first RGB values, have the second RGB values. Pixels are identified in the resulting bitmap of said 'OR' operation which have said first RGB values as transparent.

DETAILED DESCRIPTION OF THE INVENTION

Figure 1:
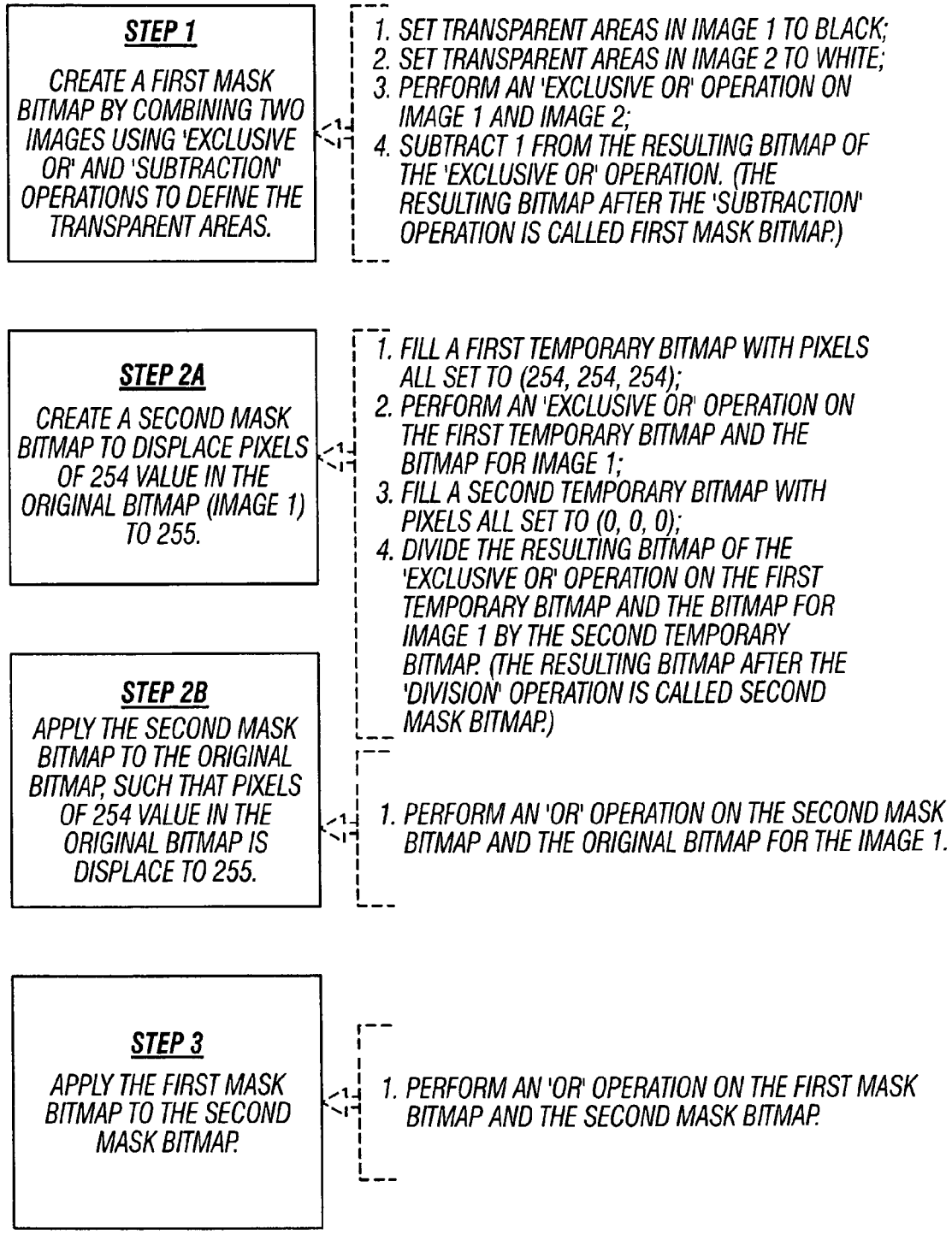
FIG. 1 is a flow diagram illustrating a process according to the invention, comprising various steps that collectively enable the functionality of the invention.

FIG. 1 is a flow diagram illustrating a process according to the invention, comprising various steps that collectively enable the functionality of the invention. In the process, bitmap operations of 'or', 'exclusive-or', 'divide' and 'subtract' are used. These operations are common to most graphics systems and are efficient for bitmaps. In the examples shown by a set of tables given below, only nine pixels are included, and only single bytes are used to represent pixels to make the process easy to understand. In the real implementation, the number of pixels in an image is very large, and each pixel is represented by three bytes, one for each of red, green and blue.

The process according to the invention comprises the steps of:

Step 1: Create a First Mask Bitmap to Define the Transparent Areas

This step starts by combining two images (Image 1 and Image 2) with different background colors using an 'exclusive or' operation.

These two images have the same size and are the same except for transparent areas. Table 1 shows the key referring to positions of 9 pixels in the bitmap for the images. In image 1, all areas where should be transparent are set to black (0, 0, 0) as shown in Table 2. In image 2, all areas where should be transparent are set to white (255, 255, 255) as shown in Table 3.

TABLE 1

| Key referring to positions in the bitmap | | |
|---|---|---|
| 1, 1 | 2, 1 | 3, 1 |
| 1, 2 | 2, 2 | 3, 2 |
| 1, 3 | 2, 3 | 3, 3 |

TABLE 2

| Bitmap for Image 1 wherein transparent pixels are set to black (0, 0, 0) | | |
|---|---|---|
| 0 | 0 | 0 |
| 128 | 255 | 0 |
| 128 | 128 | 254 |

TABLE 3

| Bitmap Image 2 wherein transparent pixels are set to white (255, 255, 255) | | |
|---|---|---|
| 0 | 255 | 255 |
| 128 | 255 | 255 |
| 128 | 128 | 254 |

The 'exclusive or' operation on these two images creates two binary results for each position: it is 1 if two values in a same position are different, and it is 0 if two values in a same position are same.

Referring to Table 4, after the 'exclusive or' operation is performed, the resulting rgb values at positions (2,1), (3,1) and (3,2) are set to white (255, 255, 255) because the corresponding bits in each of these positions were different. All other areas are set to black (0, 0, 0) because the corresponding values in two images were equal.

TABLE 4

Bitmap after 'exclusive or' operation on Image 1 and Image 2

| 0 | 255 | 255 |
|---|---|---|
| 0 | 0 | 255 |
| 0 | 0 | 0 |

Then, subtract 1 from the bitmap shown in Table 4. After the 'subtraction' operation, all black pixels (0,0,0) remains unchanged, and all white pixels (255, 255, 255) are changed to quasi-white (254, 254, 254). These pixels with rgb values (254, 254, 254) at positions (2,1), (3, 1) and (3,2) are transparent areas. The bitmap shown in Table 5 is hereby named as the first mask bitmap.

TABLE 5

Bitmap after 'subtraction' (First Mask Bitmap)

| 0 | 254 | 254 |
|---|---|---|
| 0 | 0 | 254 |
| 0 | 0 | 0 |

Step 2: Change Pixels in the Original Bitmap that Had RGB Values (254, 254, 254) to Pixels with RGB Values (255, 255, 255)

Two sub-steps are used to change any pixels that were originally quasi white (254, 254, 254) to white (255, 255, 255), so that transparency is not shown where it should not be shown. This is an operation on the original bitmap of Image 1, which had black pixels where the transparent areas should be shown. There may be other black pixels that can be handled by this algorithm.

Step 2A: Create a Second Mask Bitmap

This sub-step comprises:

1. Filling a first temporary bitmap with pixels that are all set to quasi-white (254, 254, 254) as shown in Table 6.

TABLE 6

First temporary bitmap

| 254 | 254 | 254 |
|---|---|---|
| 254 | 254 | 254 |
| 254 | 254 | 254 |

2. Combining the first temporary bitmap shown in Table 6 with the original bitmap for Image 1 shown in Table 2 using an 'exclusive or' operation. In the resulting bitmap shown in Table 7, the corresponding areas where they were quasi-white (254, 254, 254) in the original bitmap for image 1 shown in Table 2 now become black (0, 0, 0), and all other areas have random values (i.e. anything but 0, 0, 0).

TABLE 7

The resulting bitmap after 'exclusive or' operation

| 254 | 254 | 254 |
|---|---|---|
| 126 | 1 | 254 |
| 126 | 126 | 0 |

3. Filling a second temporary bitmap with pixels that are all set to black pixels (0, 0, 0) as shown in Table 8.

TABLE 8

Second temporary bitmap

| 0 | 0 | 0 |
|---|---|---|
| 0 | 0 | 0 |
| 0 | 0 | 0 |

4. Dividing the resulting bitmap shown in Table 7 by the second temporary bitmap shown in Table 8. After the 'division' operation, any black pixels (0, 0, 0) in the bitmap shown in Table 7 now become white (255, 255, 255) and any pixels that were anything else become black (0, 0, 0). The result of this operation shown in Table 9 is hereby named as the second mask bitmap.

TABLE 9

Mask bitmap after 'division' operation (Second Mask Bitmap)

| 0 | 0 | 0 |
|---|---|---|
| 0 | 0 | 0 |
| 0 | 0 | 255 |

Comparing Table 2 with Table 9, it is clear that any pixels that were originally quasi-white (254, 254, 254) in Image 1 (Table 2) are now white (255, 255, 255) in the mask bitmap (Table 9) and all other pixels in Image 1 (Table 2) are now black (0, 0, 0) in the mask bitmap (Table 9).

Step 2B: Apply the Second Mask Bitmap to the Original Bitmap

This is to apply the second mask bitmap (Table 9) from Step 2A to the original bitmap (Table 2) using an 'or' operation, wherein 0 or'd with anything returns the original value, and 255 (binary 11111111) or'd with anything returns 255.

After the 'or' operation, any pixels that were quasi-white (254, 254, 254) in Table 2 now become white (255, 255, 255) and all other pixels in Table 2 keep unchanged as shown in Table 10. In this operation, actually any pixels that had a byte with a value of 254 in Table 2 now is changed to a byte with a value of 255, which is almost indistinguishable in the exported image.

TABLE 10

Apply second mask bitmap to the original bitmap with an 'or' operation

| 0 | 0 | 0 |
|---|---|---|
| 128 | 255 | 0 |
| 128 | 128 | 255 |

Step 3: Apply First Mask Bitmap to Second Mask Bitmap

This is to apply the first mask bitmap from Step 1 shown in Table 5 to the second mask bitmap from Step 2B shown in Table 10 using an 'or' operation, wherein 0 or'd with anything returns the original value, and 255 (binary 11111111) or'd with anything returns 255.

The result of the 'or' operation is the bitmap where the set of pixels with rgb values (254, 254, 254) should be transparent. The transparent file is written out with that color marked as the transparent color. Any pixels that originally had rgb values (254, 254, 254) now have rgb values (255, 255, 255), a change that is very close to the original and not visible to most users.

Table 11 shows the expected result from applying the process to the two input bitmaps. The rgb values of the positions (1,2), (2,2), (1,3) and (2,3) in the exported image are unchanged from their original values. The position at (3,3) has changed from rgb values (254, 254, 254) to rgb values (255, 255, 255). This is desired because the image is to be saved for displaying all pixels with rgb values (254, 254, 254) as transparent and the pixel at the position (3,3) should not be transparent. The pixels at (2,1), (3,1) and (3,2) all have rgb values (254, 254, 254), which are treated as transparent.

TABLE 11

Apply the mask from Step 1 with an 'or' operation

| 0 | 254 | 254 |
|---|-----|-----|
| 128 | 255 | 254 |
| 128 | 128 | 255 |

Table 12 is the VBScript code implementation of the process described herein.

TABLE 12

VBScript

```
BEGIN
    MultiUse = -1   'True
END
Attribute VB_Name = "SXKeitherizer"
Attribute VB_GlobalNameSpace = False
Attribute VB_Creatable = False
Attribute VB_PredeclaredId = False
Attribute VB_Exposed = False
Option Explicit
Private Const TRANSPARENT_COLOR As Long = &HFEFEFE
Private Const BACKUP_COLOR As Long = &HFFFFFF
Private Const PIXEL_SCALE_MODE As Integer = 3
' Takes two images which are the same size and the same except
for transparent
' areas and changes the first image 11 so that those
transparent pixels are set to
' rgb(254, 254, 254). If there were any pixels originally at
that value, they will
' have been changed to rgb(255, 255, 255).
'
' We assume that 11 has black pixels where there should be
' transparency and that 12 has white pixels where there should
be transparency
Public Sub Keitherize(11 As LEAD, 12 As LEAD)
    11.ScaleMode = PIXEL_SCALE_MODE
    12.ScaleMode = PIXEL_SCALE_MODE
    ' get the dimensions
    Dim width As Single
    Dim height As Single
    width = 11.BitmapWidth
    height = 11.BitmapHeight
    ' create a mask where the transparent areas have pixels =
FEFEFE and all others areas
        ' have pixels = 0
    Dim transparentMask As LEAD
    Set transparentMask = CreateTransparentMask(11, 12)
    ' bump any pixels in 11 which are at transparentColor so
that they are at backupColor
    Bump 11
    ' set all pixels which are different in 11 and 12 equal to
transparentColor in 11
    11.Combine 0, 0, width, height, transparentMask.Bitmap, 0,
0, CB_OP_OR
End Sub
' changes 11 so that each pixel that was at rgb(254, 254, 254)
now becomes
' rgb(255, 255, 255)
Private Sub Bump(11 As LEAD)
    ' create a mask of the same size as 11 where each pixel
that was at
    ' TRANSPARENT_COLOR is now BACKUP_COLOR and all
other pixels in the mask are 0
    Dim mask As LEAD
```

TABLE 12-continued

VBScript

```
    Set mask = CreateMask(11, TRANSPARENT_COLOR)
    ' apply the mask to 11, bumping pixels that had the
TRANSPARENT_COLOR value to the
    ' BACKUP_COLOR. we are counting on the fact that
BACKUP_COLOR is all ones when we
    ' do the or
    11.Combine 0, 0, 11.Bitmapwidth, 11.BitmapHeight,
mask.Bitmap, 0, 0, CB_OP_OR
End Sub
' creates a new image of the same size as 11 where all pixels
that were sourceColor in 11
' are set to white and all other pixels are set to 0
Private Function CreateMask(11 As LEAD, sourceColor As Long)
As LEAD
    Dim mask As New LEAD
    mask.ScaleMode = PIXEL_SCALE_MODE
    ' set the width and height of the mask to match the input
image
    Dim width As Single
    Dim height As Single
    width = 11.Bitmapwidth
    height = 11.BitmapHeight
    mask.CreateBitmap width, height, 24
    ' after this, the mask bitmap will have 0's where 11 had
sourceColor pixels and
    ' random garbage everywhere else
    mask.fill sourceColor
    mask.Combine 0, 0, width, height, 11.Bitmap, 0, 0,
CB_OP_XOR
    ' PENDING(greg) we could create a single black image which
we kept reusing
    ' (growing as needed) if that sped things up
    ' create a black image of the same size for use below
    Dim tempBlackImage As New LEAD
    tempBlackImage.ScaleMode = PIXEL_SCALE_MODE
    tempBlackImage.CreateBitmap width, height, 24
    tempBlackImage.fill RGB(0, 0, 0)
    ' take all 0 pixels and make them into 255 pixels, and
convert the random garbage
    ' into 0 pixels in a single step
    mask.Combine 0, 0, width, height, tempBlackImage.Bitmap,
0, 0, CB_OP_DIVDST
    Set CreateMask = mask
End Function
Private Function CreateTransparentMask(11 As LEAD, 12 As LEAD)
As LEAD
    ' duplicate 11 and use it for the mask
    Dim mask As New LEAD
    maskScaleMode = PIXEL_SCALE_MODE
    mask.Bitmap = 11.Bitmap
    ' get the dimensions
    Dim width As Single
    Dim height As Single
    width = 11.Bitmapwidth
    height = 11.BitmapHeight
    ' combine the two bitmaps so that pixels which were equal
(non-transparent)
    ' are 0 and pixels which were unequal (transparent) are
white (0 xor 1 is 1)
    mask.Combine 0, 0, width, height, 12.Bitmap, 0, 0,
CB_OP_XOR
    ' subtract one from all the pixels, leaving 0 alone and
reducing the 255s to 254
    Dim tempImage As New LEAD
    tempImage.ScaleMode = PIXEL_SCALE_MODE
    tempImage.CreateBatmap width, height, 24
    tempImage-fill &H10101
    mask.Combine 0, 0, width, height, tempImage.Bitmap, 0, 0,
CB_OP_SUBSRC
    Set CreateTransparentMask = mask
End Function
```

In the process described herein, the value 254 is preferably used for the first mask bitmap i.e. the bitmap after 'subtraction' and the first temporary bitmap. In actuality, any eight-bit value close to white, such as 253 or 252, may be used. The problem is that, in the final step, the pixels of that value need to be displaced to the value of 255 and the further that value is from 255, the more noticeable the difference will be.

This invention is preferably used in a system where the input images does not encode transparency directly, but rather outputs transparent pixels in a color that is specified. In addition, the output images need to be set in a format e.g. GIF, PNG, which assigns transparency to pixels based on their color. Finally, this invention is optimized for situations where wholesale bitmap operations are faster than manipulating each byte individually. For instance, the MMX capability of recent Pentium chips (Intel Corporation, Santa Clara, Calif.) has this optimization.

Although the invention is described herein with reference to the preferred embodiment, one skilled in the art will readily appreciate that other applications may be substituted for those set forth herein without departing from the spirit and scope of the invention.

Accordingly, the invention should only be limited by the claims included below.

What is claimed is:

1. A method for determining transparency in image extraction, said method comprising the steps of:
   creating a first mask bitmap by combining a first image and a second image;
   wherein said first image and said second image have the same size and are the same except for transparent areas;
   creating a second mask bitmap which displaces pixels of first rgb values in said first image to second rgb values; and
   applying said first mask bitmap to said second mask bitmap by performing an 'or' operation on said first mask bitmap and said second mask bitmap;
   wherein the pixels in the resulting bitmap of said 'or' operation which have said first rgb values are transparent;
   wherein the pixels in the resulting bitmap of said 'or' operation, corresponding to the pixels in said first image that had said first rgb values, have said second rgb values;
   identifying the pixels in the resulting bitmap of said 'or' operation which have said first rgb values as transparent.

2. The method of claim 1, wherein said step of creating a first mask bitmap comprises the sub-steps of:
   setting transparent areas in said first image to black; and
   setting transparent areas in said second image to white.

3. The method of claim 2 and further comprising the sub-step of:
   performing an 'exclusive or' operation on said first image and said second image.

4. The method of claim 3 and further comprising the sub-step of:
   subtracting 1 from the resulting bitmap of said 'exclusive or' operation;
   wherein the resulting bitmap of said 'subtraction' operation is said first mask bitmap.

5. The method of claim 1, wherein said step of creating a second mask bitmap comprises the sub-steps of:
   filling a first temporary bitmap with pixels all set to rgb values (254, 254, 254); and
   performing an 'exclusive or' operation on said first temporary bitmap and said first image.

6. The method of claim 5 and further comprising the sub-steps of:
   filling a second temporary bitmap with pixels all set to rgb values (0, 0, 0);
   dividing the resulting bitmap of said 'exclusive or' operation on said first temporary bitmap and said first image by said second temporary bitmap;
   wherein the resulting bitmap of said 'division' operation is said second mask bitmap.

7. The method of claim 6 and further comprising the sub-step of:
   applying said second mask bitmap to said first image by performing an 'or' operation on said second mask bitmap and said first image;
   wherein the pixels with said first rgb values which first values are in said first image are changed to said second rgb values which second values are (255, 255, 255).

8. A process for determining transparency in image extraction, said process comprising the steps of:
   creating a first mask bitmap by combining a first image and a second image;
   wherein said first image and said second image have the same size and are the same except for transparent areas;
   creating a second mask bitmap which displaces pixels of rgb values (254, 254, 254) in said first image to rgb values (255, 255, 255); and
   applying said first mask bitmap to said second mask bitmap by performing an 'or' operation on said first mask bitmap and said second mask bitmap;
   wherein the pixels in the resulting bitmap of said 'or' operation which have rgb values (254, 254, 254) are transparent;
   wherein the pixels in the resulting bitmap of said 'or' operation, corresponding to the pixels in said first image that had rgb values (254, 254, 254), have rgb values (255, 255, 255); and
   identifying the pixels in the resulting bitmap of said 'or' operation which have said first rgb values as transparent.

9. The process of claim 8, wherein said step of creating a first mask bitmap comprises the sub-steps of:
   setting transparent areas in said first image to black; and
   setting transparent areas in said second image to white.

10. The process of claim 9 and further comprising the sub-step of:
    performing an 'exclusive or' operation on said first image and said second image.

11. The process of claim 10 and further comprising the sub-step of:
    subtracting 1 from the resulting bitmap of said 'exclusive or' operation;
    wherein the resulting bitmap of said 'subtraction' operation is said first mask bitmap.

12. The process of claim 8, wherein said step of creating a second mask bitmap comprises the sub-steps of:
    filling a first temporary bitmap with pixels all set to rgb values (254, 254, 254); and
    performing an 'exclusive or' operation on said first temporary bitmap and said first image.

13. The process of claim 12 and further comprising the sub-steps of:
    filling a second temporary bitmap with pixels all set to rgb values (0, 0, 0);

dividing the resulting bitmap of said 'exclusive or' operation on said first temporary bitmap and said first image by said second temporary bitmap;

wherein the resulting bitmap of said 'division' operation is said second mask bitmap.

14. The process of claim 13 and further comprising the sub-step of:

applying said second mask bitmap to said first image by performing an 'or' operation on said second mask bitmap and said first image;

wherein the pixels with rgb values (254, 254, 254) in said first image is changed to rgb values (255, 255, 255).

* * * * *